United States Patent

[11] 3,538,826

| [72] | Inventor | Sakae Fujimoto<br>Chofu, Japan |
|---|---|---|
| [21] | Appl. No. | 690,011 |
| [22] | Filed | Dec. 12, 1967 |
| [45] | Patented | Nov. 10, 1970 |
| [73] | Assignee | Kabushiki Kaisha Ricoh<br>Tokyo, Japan<br>a corporation of Japan |
| [32] | Priority | Dec. 17, 1966 |
| [33] | | Japan |
| [31] | | 41/82,608 |

[54] FLASH SYNCHRONIZATION DEVICE FOR USE WITH A SINGLE LENS REFLEX CAMERA
1 Claim, 3 Drawing Figs.

[52] U.S. Cl............................................................. 95/11.5
[51] Int. Cl......................................................... G03b 9/70
[50] Field of Search............................................ 95/1
1(Lamp), 11.5

[56] References Cited
UNITED STATES PATENTS

| 2,480,604 | 8/1949 | Pirwitz........................ | 95/11.5 |
| 2,838,983 | 6/1958 | Burger......................... | 95/11.5 |
| 3,162,108 | 12/1964 | Knorr et al.................. | 95/11.5 |
| 3,228,318 | 1/1966 | Koppen........................ | 95/11.5 |

*Primary Examiner*—Norton Ansher
*Assistant Examiner*—Fred L. Braun
*Attorney*—Burgess, Ryan and Hicks ABSTRACT: A flash synchronization device having a rotatable ring, a conductive contact piece adjacent to the ring, an intermediate element, and a bow-shaped lever. The intermediate element has a pin member which extends along an axis parallel to the optical axis of the camera and engages a cam edge on the ring. The pin member serves to open and close the shutter blades of the camera, and forms a part of the switching mechanism for the flash circuit. When the reflecting mirror moves out of the optical path, the bow-shaped lever strikes the intermediate element to move the pin member toward the cam edge to subsequently open the shutter blades and bring the pin member into contact with the conductive contact piece to actuate the flash circuit.

Patented Nov. 10, 1970 3,538,826

INVENTOR.
BY Sakae Fujimoto
Burgess, Ryan & Hicks
ATTYS.

FLASH SYNCHRONIZATION DEVICE FOR USE WITH A SINGLE LENS REFLEX CAMERA

DETAILED DESCRIPTION OF THE INVENTION

Figure 1:
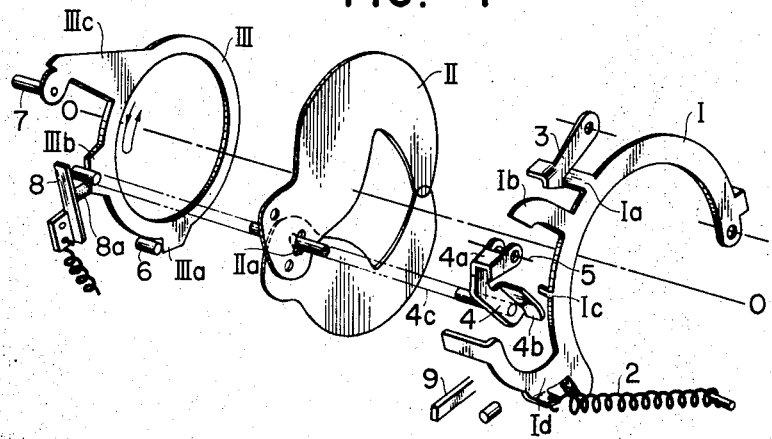

This invention relates to an improvement in a synchronized lightening device of a flashlight suitable for mounting on a single lens reflex camera incorporating a lens shutter. In a single lens reflex camera where an image to be photographed is focused by light rays passing through a photographic lens, shutter blades must normally be kept open if the shutter used therein is of a lens shutter type. With a lens shutter single lens reflex camera having a diaphragm mechanism coupled with an exposure meter, the shutter blades which have been kept open for focusing are to be closed instantaneously with the pressing of the shutter release button from outside of the camera body. The reflecting mirror then starts to retreat outside of the effective photographic light rays, when the diaphragm is adapted to be set in a suitable position to ensure correct exposure according to the brightness of the scene to be photographed. When the shutter blades complete the opening and closing movement as said reflecting mirror retreats to a predetermined position, the reflecting mirror is then adapted to return to a reflecting position and the diaphragm and shutter blades both return to their original positions concurrently. Therefore, a switch provided in a flashbulb lightening circuit (for flash-synchronized photography) must close concurrently with or immediately before the full opening of the shutter blades take place so as to conduct electricity to the flashbulb and thereby actuate the latter. On the other hand, in a single lens reflex camera having a lens shutter, the shutter blades performs opening motion twice within one photographic operation cycle of the movable elements; first for exposure and the second for returning to its original position. This means that while a flash-synchronizing switch needs to be closed only during exposure time, it is also closed as the camera is set for its normal position in which its lens shutter is opened. Therefore, a flashbulb can be wasted if it goes the moment it is inserted into an insertion socket. A conventional method to overcome the above-mentioned drawback is to make use of movement of a shutter-operating lever. That is to say, the flash-sychronizing switch is designed such that it closes when said shutter-operating lever takes a position corresponding to the opening of the shutter blades which is coupled with motion of said lever. In other words, opening and closing movement of the flash-synchronizing switch is directly controlled by the shutter-operating lever and as such, in terms of operation steps, the opening and closing movement of such switch circuit takes place prior to actions of shutter blades and shutter opening and closing ring connected therewith, although such actions are coupled with motion of said shutter-operating lever which is operatable from outside of the camera body. In view of the fact that the shutter opening and closing ring is generally coupled with the shutter-operating lever through a number of intermediate coupling elements, correct synchronization of the opening and closing motion of said flash-lightening switch circuit with the opening motion of the shutter blades is not only difficult, but also requires considerable time for adjustment, which in turn, lowers efficiency of assembly work. The primal objective of the present invention, therefore, is to eliminate the aforementioned drawbacks with relatively simple mechanism.

BRIEF DESCRIPTION OF THE ACCOMPANYING DRAWINGS

Figure 2:
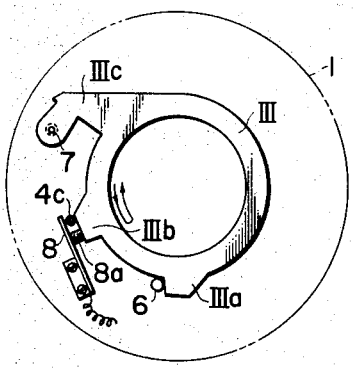
Figure 3:
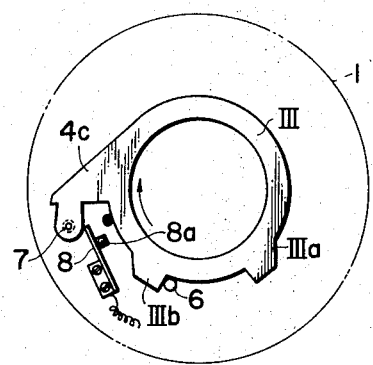

FIG. 1 is a perspective view of movable elements constituting main part of the apparatus according to this invention, illustrating them disassembled in the direction of the optical axis of the photographic lens; and FIGS. 2 and 3 are plan views illustrating movement of a switch contact piece for the use of synchronized lightening of a flash unit in accordance with the rotary movement of a shutter blade opening and closing ring.

For a fuller understanding of the nature and the objects of this invention, reference should be had to the following detailed description taken in connection with the accompanying drawings wherein:

FIG. 1 is a slant view of shutter blades of a lens shutter in a single lens reflex camera and relevant main parts for opening and closing said shutter blades, both said shutter blades and the relevant parts being shown disassembled in the direction of an optical axis 0–0 of the photographic lens and the camera body being omitted. On the right extension of said optical axis 0–0 is provided a photographic lens not shown and in the order from the front are arranged a bow-shaped arm I, shutter blades II and ring III. The latter three elements are mounted, as hereinafter described, in close proximity with each other, on both sides of a base plate which is fixedly positioned between the bow-shaped lever I and the shutter blades II at right angle with said optical axis 0–0. Shown in FIGS. 2 and 3 in dot-and-dash lines is the base plate which is provided, where necessary, with notches or throughholes so as to enable said three elements I, II and III to be coupled with each other as hereinafter described.

The bow-shaped lever I, is pivoted, at one end, said base plate and arranged such that it encircles half of the periphery of the light rays that come from the scene to be photographed, is urged to rotate in a counterclockwise direction around its pivotal axis by the force of a spring 2. An extension I$a$ which is bent backward from the outer periphery of the bow-shaped lever I is adapted to be engaged with a hook of an arm lever 3 which is urged to rotate in a counterclockwise direction around its base portion pivoted on the camera body. The bow-shaped lever further carries extensions I$b$, I$c$ and I$d$, an extreme end of I$b$ being slightly bent towards I$c$ which, in turn, is bent backwards. The extension I$d$ is also bent backwards.

In the vicinity of said extension I$c$ is provided, in relation to the oscillatory movement of said bow-shaped lever I, an intermediary transmittant element 4 adapted to open and close the shutter blades II. The element 4 is urged to rotate, by the force of a spring not shown, in a counterclockwise direction around its pivotal axis 5 which is fixed on a suitable member of the camera. The element 4 further carries, in angles with the plane of its oscillating movement, extensions 4$a$ and 4$b$ which are formed integral therewith, said extension 4$a$ being adapted to be positioned such that it strikes against the extension I$b$ of the bow-shaped lever I, and the extension 4$b$, against the other extension I$c$. A pin 4$c$ which extends backward from the element 4 is loosely fitted through an opening II$a$ formed by the overlaid slots of a pair of shutter blades and is extended to a position in which it presses against the circumference of the ring III. The ring III makes, as in the case of a known shutter blades opening and closing ring in a lens shutter, swinging movement for a given angle around the optical axis 0–0 of the photographic lens in association with shutter-releasing operation. The driving mechanism for such swinging movement is not shown in the figures, because any known mechanism including those used for shutter blade opening and closing rings in conventional lens shutters can be adopted. On the outer periphery of said ring III are provided extensions III$a$ and III$b$ between which is interposed a fixed pin 6 substantially integral with the camera body, such as a pin 6 planted on the base plate 1, whereby range of swinging movement of the ring III is limited. The ring III has another integral arm lever III$c$ which carries, at its extremity, a pin 7 which is coupled with a movable mirror for reflecting a focused image.

The aforesaid extension III$b$ of the ring III has a cam function and cooperates with a pin 4$c$ which is biased to be pressed against the circumference of the ring III. In the vicinity of said extension III$b$ is an elastic conductive plate 8 which is mounted electrically insulated on the base plate 1. On the inner surface of said conductive plate is mounted an insulated separater piece 8$a$ which is lightly pressed against the circumferential cam surface of the extension III$b$, thereby allowing, when the ring III takes a limited position of its clockwise rotation, a suitable space between said cam surface and the conductive plate. In this instance, the plate 8 does not come into contact with the pin 4c which is pressed against the circumferential cam surface of the extension IIIb, because the diameter of said pin 4c is designed short of the thickness of said separater piece 8a. Needless to mention, both conductive plate 8 and the pin 4c function as switch contacts for flash synchronization circuit. The actual operation of the present invention will now be described in connection with an example embodiment shown in the drawings. FIGS. 1 and 2 show status in which the film is already wound whereby the power source not shown is charged and the camera is all set for taking photography. In this situation, a movable reflecting mirror not shown is adapted to intercept the light rays that come from the scene to be photographed through the photographic lens and the opened shutter blades. Furthermore, the pin 4c and the conductive plate 8 which form switch contacts for the flash synchronization circuit hold such positions as shown in FIG. 2 relative to the circumferential cam surface of the extension IIIb, which causes the flash synchronization circuit to open. Upon pressure of a shutter release button provided outside of the camera body, the ring III makes a counterclockwise rotation from a position shown in FIG. 2 to a position shown in FIG. 3 through a known mechanism not shown. Concurrently, the pin 4c rolls down the slant surface of the extension IIIb to rest in a position shown in actual line in FIG. 3, while the conductive plate 8 remains slightly bent towards the inside due to its original elasticity, and does not come into contact with said pin 4c. As the pin 4c shifts as hereinabove described, the shutter blades are closed and instantaneously, the extension 4b of the element 4 which is integrated with said pin intrudes into the movement path of the extension Ic of the bow-shaped lever I. The counterclockwise rotation of the ring III is adapted to cause the movable reflecting mirror not shown to fling up through a pin 7, and when the reflecting mirror is fully swung, the arm lever 3 shown in FIG. 1 which is coupled with said reflecting mirror is caused to rotate in a clockwise direction around its axis, thereby disengaging from extension Ia of the bow-shaped lever I. This permits said bow-shaped lever I to rotate around its axis by the force of a spring 2, whereupon the extension Ic strikes against the extension 4b, whereby the element 4 is caused to rotate, against its bias, in a clockwise direction around its axis 5. Concurrently with the clockwise rotation of the element 4, the pin 4c which is integral with said element shifts towards outside, thereby causing the shutter blades II to open again. As the pin 4c shifts to a position shown in dotted lines in FIG. 3 in which it comes in contact with the conductive plate 8, the flash synchronization circuit is closed, the flashbulb is lighted and flash photography is performed. The duration of time in which the shutter blades are kept open by the rotation of the element 4 which is caused by the extension Ic of the bow-shaped lever I, can be adjusted by a known governor mechanism not shown.

When the extension Ic of the bow-shaped lever I slides away from the surface of the extension 4b, another extension Ib is adapted to strike against the extension 4a, which, cooperating with the rotary bias of the element 4, causes the element 4 to quickly rotate in a counterclockwise direction around its axis 5, whereby the pin 4c returns towards inside to its original position, thus closing the shutter blades. The movable reflecting mirror is then restored to its reflecting position through a suitable mechanism, whereupon the ring III is rotated, through a pin 7 shown in FIG. 1, in a clockwise direction around the optical axis 0–0, causing the pin 4c to shift from a position shown in actual line in FIG. 3 to its original position in FIG. 2, thereby opening the shutter blades again. Upon winding the film for the next shot, a suitable element, such as shown in FIG. 1 as an element 9 provided below said bow-shaped lever I, which makes reciprocating movement in conjunction with the film-winding motion, pushes up the bent free end of the bow-shaped lever I to cause the element 3 to engage with the extension Ia. This brings all the movable elements to respective positions as shown in FIG. 1.

According to the present invention, therefore, the opening of the shutter blades and the lightening of the flashbulb or flashtube are correctly synchronized because a pin which is directly related to the opening and closing of the shutter blades is used as a contact piece of a switch for flash synchronization circuit. Furthermore, despite the fact that the shutter blades are opened twice in one photographic cycle, the present invention ensures the synchronization circuit to close only once when lightening of of the flash is required, thus preventing untimely lightening of the flashbulb or flashtube. In addition, inasmuch as the construction of this invention is relatively simple, adjustment of flash-lightening time relative to the shutter release operation can be obliviated and the assembly work is considerably simplified.

I claim:

1. In a lens shutter to be equipped with a single lens reflex camera having shutter blades which are adapted to be normally kept open, to close immediately before the reflecting mirror withdraws from the optical path, and to fully open again immediately after the reflecting mirror has completely moved out from the optical path, comprising a ring which rotates, coupled with shutter release operation, clockwise or counterclockwise by a given angle around the optical axis of a photographic lens, an intermediate element carrying a pin which, coupled with a film-winding operation, opens and closes the shutter blades, and a bow-shaped lever which acts on said intermediate element and moves said pin in association with its own revolution in one direction under the force of elasticity, and a flash synchronization device for use with said lens shutter incorporated in a single lens reflex camera, characterized in that, the outer circumference of said ring coupled with the shutter release operation is provided with a cam edge on which said pin is adapted to be pressed, a conductive contact piece of a flash synchronization circuit which is provided with an insulating separator piece having greater thickness than the diameter of said pin, so that, upon rotation by a given angle of said ring coupled with the shutter release operation, said pin is adapted to be disengaged from the cam edge, thereby closing the shutter blades and completing preparation of a reflecting mirror to move away from the optical path, and when the reflecting mirror has moved out of the optical path the rotary movement of said bow-shaped lever is initiated to strike against said intermediate element, whereupon said pin of the intermediate element is moved toward the cam edge whereby the shutter blades are caused to open and concurrently said pin comes in contact with said conductive contact piece, thereby forming the flash synchronization circuit.